United States Patent
Liu et al.

(10) Patent No.: US 8,675,470 B2
(45) Date of Patent: Mar. 18, 2014

(54) CROSSTALK COEFFICIENT ESTIMATING APPARATUS AND CROSSTALK COEFFICIENT ESTIMATING METHOD

(75) Inventors: Ling Liu, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 424 days.

(21) Appl. No.: 12/956,507

(22) Filed: Nov. 30, 2010

(65) Prior Publication Data
US 2011/0142455 A1 Jun. 16, 2011

(30) Foreign Application Priority Data
Dec. 1, 2009 (CN) .......................... 2009 1 0246695

(51) Int. Cl.
*H04J 1/12* (2006.01)
(52) U.S. Cl.
USPC ............................ 370/201; 370/241; 370/252
(58) Field of Classification Search
USPC .......................... 370/201, 241, 252, 276, 286
See application file for complete search history.

(56) References Cited

U.S. PATENT DOCUMENTS

| | | | | |
|---|---|---|---|---|
| 7,558,479 B1* | 7/2009 | Robinson | ........................ | 398/28 |
| 2004/0161165 A1* | 8/2004 | Riley et al. | .................... | 382/294 |
| 2005/0152463 A1* | 7/2005 | DeChamps et al. | .......... | 375/260 |
| 2009/0092036 A1* | 4/2009 | Peeters et al. | .................. | 370/201 |
| 2009/0116582 A1* | 5/2009 | Ashikhmin et al. | .......... | 375/296 |
| 2009/0175156 A1* | 7/2009 | Xu | ................................. | 370/201 |
| 2009/0245081 A1* | 10/2009 | Ashikhmin et al. | .......... | 370/201 |
| 2009/0310502 A1* | 12/2009 | Nuzman et al. | ................ | 370/252 |
| 2012/0183025 A1* | 7/2012 | Manickam et al. | ........... | 375/222 |

OTHER PUBLICATIONS

Chinese Office Action mailed Mar. 8, 2013 for corresponding Chinese Application No. 200910246695.0.

* cited by examiner

*Primary Examiner* — Kwang B Yao
*Assistant Examiner* — Nguyen Ngo
(74) *Attorney, Agent, or Firm* — Staas & Halsey LLP

(57) ABSTRACT

This invention relates to crosstalk coefficient estimating apparatus and crosstalk coefficient estimating method. The crosstalk coefficient estimating apparatus is used to estimate a crosstalk coefficient of crosstalk inflicted on one channel of an optical fiber transmission system comprising two or more channels. The crosstalk coefficient estimating apparatus comprises a complex conjugate unit, for obtaining a complex conjugate signal for signal in one polarization-state of another channel other than said one channel; a multiplying unit, for multiplying the complex conjugate signal obtained by the complex conjugate unit with signal in another polarization-state of the another channel; and a filter, for filtering the multiplication result of the multiplying unit to obtain a crosstalk coefficient of crosstalk inflicted on the signal in one polarization-state of said one channel, wherein a transmission function of the filter is set according to system parameters of the optical fiber transmission system.

10 Claims, 13 Drawing Sheets

CROSSTALK COEFFICIENT ESTIMATING APPARATUS AND CROSSTALK COEFFICIENT ESTIMATING METHOD

FIELD OF THE INVENTION

This invention relates to communications, and more particularly to nonlinear polarization crosstalk estimation in optical communication systems.

BACKGROUND OF THE INVENTION

The polarization multiplexing system can simultaneously transmit two independent signals (h and v) in the same bandwidth by using two orthogonal polarization states (x and y) of the light, thus increasing twofold the transmission efficiency of the channel. However, in the wavelength division multiplexing system, as compared to a single polarization system, the nonlinear effect between channels in the polarization multiplexing system has even greater influence. As found by the inventors during the process of studying the present invention, the nonlinear effect between channels (i.e. cross-phase modulation) may cause nonlinear phase noise and nonlinear polarization crosstalk, of which the nonlinear polarization crosstalk is the principal factor that leads to damage of nonlinearity between channels in the wavelength division multiplexing system employing polarization multiplexing modulation, while the study on nonlinear polarization crosstalk caused by cross-phase modulation is currently few and far between.

SUMMARY OF THE INVENTION

The present invention is proposed in view of the aforementioned problems and defects in the prior art to remove or alleviate one or more problems due to deficiencies and restrictions in the prior art.

To achieve the objectives of the present invention, there is provided according to one aspect of the present invention a crosstalk coefficient estimating apparatus for estimating a crosstalk coefficient of crosstalk inflicted on one channel of an optical fiber transmission system including two or more channels. The crosstalk coefficient estimating apparatus includes a complex conjugate unit, for obtaining a complex conjugate signal for signal in one polarization-state of another channel other than said one channel; a multiplying unit, for multiplying the complex conjugate signal obtained by the complex conjugate unit with signal in another polarization-state of the another channel; and a filter, for filtering the multiplication result of the multiplying unit to obtain a crosstalk coefficient of crosstalk inflicted on the signal in one polarization-state of said one channel, wherein a transmission function of the filter is set according to system parameters of the optical fiber transmission system.

According to another aspect of the present invention, there is provided a crosstalk coefficient estimating method for estimating a crosstalk coefficient of crosstalk inflicted by one channel on another channel of an optical fiber transmission system. The crosstalk coefficient estimating method includes obtaining a complex conjugate signal for signal in one polarization-state of the one channel; multiplying the complex conjugate signal with signal in another polarization-state of the one channel; and filtering the multiplication result by using a filter to obtain a crosstalk coefficient, wherein a transmission function of the filter is set according to system parameters of the optical fiber transmission system.

With reference to the following descriptions and drawings, these and further aspects and features of the present invention will become more apparent. Embodiments of the present invention are disclosed in detail in the descriptions and drawings, and the manners whereby the principles of the present invention can be implemented are indicated. As should be understood, the present invention is not restricted thereby in scope. The present invention includes various modifications, variations and equivalence s within the scope of the spirits and provisos in the attached claims.

DETAILED DESCRIPTION OF THE INVENTION

Embodiments of the present invention are described in detail below with reference to the accompanying drawings.

These embodiments are all exemplary in nature, rather than restrictive of the scope of the present invention.

The First Embodiment

In the study on the interference of an adjacent channel on the current channel in a wavelength division multiplexing system, the current channel is regarded as a detection channel, and the adjacent channel is regarded as a pump channel.

Figure 1:
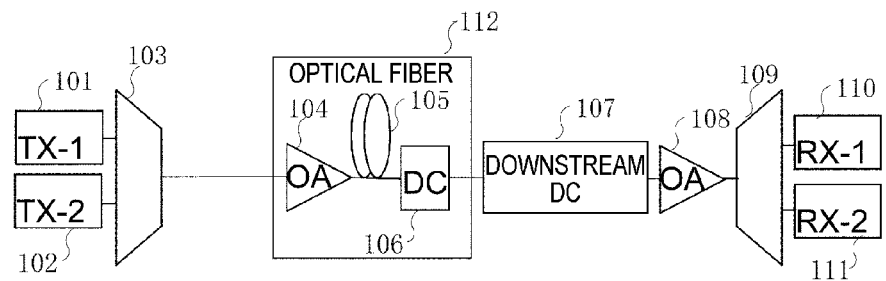
FIG. 1 shows an optical fiber transmission system, with respect to which the crosstalk coefficient estimating apparatus according to the first embodiment of the present invention is to estimate polarization crosstalk coefficient.

FIG. 1 shows an optical fiber transmission system, with respect to which the crosstalk coefficient estimating apparatus according to the present invention is to estimate nonlinear polarization crosstalk coefficient.

The optical fiber transmission system as shown in FIG. 1 is a single-pump, single-span optical fiber transmission system. As shown in FIG. 1, lights emitted from a detection channel transmitter (TX-1) 101 and a pump channel transmitter (TX-2) 102 are combined with other via a wave combiner 103, then enter an optical transmission span 112 including an online optical amplifier (OA) 104, a transmission optical fiber 105 and an online chromatic dispersion compensation (DC) unit 106 (optional, as not indispensable), and arrive at a postpositive chromatic dispersion compensation unit 107 (optional, as not indispensable) and a postpositive optical amplifier 108 (optional, as not indispensable) via the optical transmission span 112. The lights are then divided via a wave divider 109, and are finally received by a detection channel receiver (RX-1) 110 and a pump channel receiver (RX-2) 111. In the present documents, crosstalk coefficient of the crosstalk of the pump light (light emitted from the pump channel transmitter) on the detection light (light emitted from the detection channel transmitter) is to be estimated.

The input/output relation of the optical fiber communication system can be modeled as the following formula:

$$\begin{bmatrix} A_{1x,o} \\ A_{1y,o} \end{bmatrix} = \begin{pmatrix} w_{xx} & w_{yx} \\ w_{xy} & w_{yy} \end{pmatrix} \begin{bmatrix} A_{1x,i} \\ A_{1y,i} \end{bmatrix} \quad \text{(Formula 1)}$$

$A_{1x,i}$ and $A_{1y,i}$ are the signals of two polarization states of the detection light input into the optical transmission span 112, while $A_{1x,o}$ and $A_{1y,o}$ are the signals of two polarization states of the detection light output from the optical transmission span 112. The crosstalk coefficient of the crosstalk for the pump light on the signal of the x polarization state of the detection light is Wyx, and the crosstalk coefficient of the crosstalk of the pump light on the signal of the y polarization state of the detection light is Wxy. The two coefficients are derived from the interference of the pump channel on the detection channel, and the interference on the signal of one polarization state of the detection light is generated by the pump light acting on the signal of another polarization state of the detection light. The apparatus that estimates the two coefficients is described below.

Figure 2:
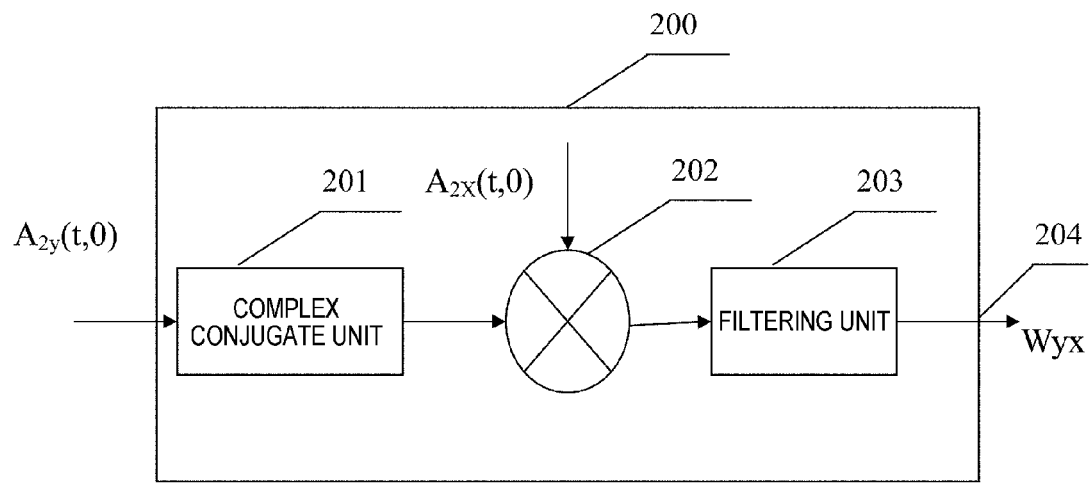
FIG. 2 shows an example of the crosstalk coefficient estimating apparatus according to the first embodiment of the present invention.

FIG. 2 shows an example of the crosstalk coefficient estimating apparatus according to the first embodiment of the present invention. As shown in FIG. 2, the example of the crosstalk coefficient estimating apparatus 200 according to the first embodiment of the present invention includes a complex conjugate unit 201, a multiplying unit 202 and a filtering unit 203. The crosstalk coefficient estimating apparatus 200 shown in FIG. 2 is also referred to as the basic crosstalk coefficient estimating apparatus 200.

The complex conjugate unit 201 calculates a complex conjugate of the signal of one polarization state of the pump light input into the optical transmission span 112. In the example as shown in FIG. 2, the complex conjugate of the signal $A_{2y}(t,0)$ of the polarization state y is to be calculated to obtain a complex conjugate signal. $A_{2y}(t,0)$ represents the input signal of the polarization state y, 2 represents the pump signal (except for 1 that represents the detection channel, the remaining data all represent the pump signal), y represents the signal of the polarization state y, t represents the waveform of the signal varying with time, and 0 represents the signal at the transmission distance which is 0, namely the input signal. Output from the complex conjugate unit 201 is input into the multiplying unit 202, and is multiplied at the multiplying unit 202 with the signal $A_{2x}(t,0)$ of another polarization state of the pump light input into the optical transmission span 112. $A_{2x}(t,0)$ represents the input signal of the polarization state x, 2 represents the pump signal, x represents the signal of the polarization state x, t represents the waveform of the signal varying with time, and 0 represents the signal at the transmission distance which is 0, namely the input signal. The multiplication result is input into the filtering unit 203 for low-pass filtering.

The two signals, $A_{2x}(t,0)$ and $A_{2y}(t,0)$, are input pump signals, which are known system parameters of the optical transmission system as shown in FIG. 1.

The filtering unit 203 can for instance be a low-pass filter whose transmission function is set in accordance with system parameters of the optical fiber transmission system. In other embodiment, transmission function $H(\omega)$ can be set as follows, for instance:

$$H(\omega) = -\frac{j8\gamma}{9} \frac{e^{(-\alpha+j\omega\beta_2\Delta\omega)L}-1}{-\alpha+j\omega\beta_2\Delta\omega} \quad \text{(Formula 2)}$$

As should be noted, what is shown in Formula 2 is merely a simplified formula, is exemplary in nature, and is not restrictive of the present invention. If other simplification assumptions are used, there will be other slightly different representations. Formulas will also be different for different system configurations, for example, a transmission configuration that is different from that shown in FIG. 1.

In Formula 2, $\omega$ is the parameter of the transmission function, representing frequency. L, $\gamma$, $\beta_2$, $\alpha$ are the length of the optical fiber 105, the nonlinear coefficient of the optical fiber 105, the group rate chromatic dispersion coefficient of the optical fiber 105, and the attenuation coefficient of the optical fiber 105, respectively, while $\Delta\omega$ $2\pi(f_{detection}-f_{pump})$ is the differential value between central frequencies of the detection channel and the pump channel, and j is a unit imaginary number.

The output signal 204 of the filtering unit 203 is precisely the estimated crosstalk coefficient of the pump signal to the signal of a certain polarization state of the detection signal. Specifically, in the case the input into the complex conjugate unit 202 as shown in FIG. 2 is $A_{2y}(t,0)$, and $A_{2x}(t,0)$ is input into the multiplying unit 202, the resultant output signal 204 is the crosstalk coefficient Wyx of the crosstalk of the signal of the pump light on the signal $A_{1x}$ of the polarization state x of the detection light. If $A_{2y}(t,0)$ is input into the multiplying unit 202, and $A_{2x}(t,0)$ is input into the complex conjugate unit 201, it is possible to obtain the crosstalk coefficient Wxy of the crosstalk of the signal of the pump light on the signal $A_{1y}$ of the polarization state y of the detection light.

Figure 3:
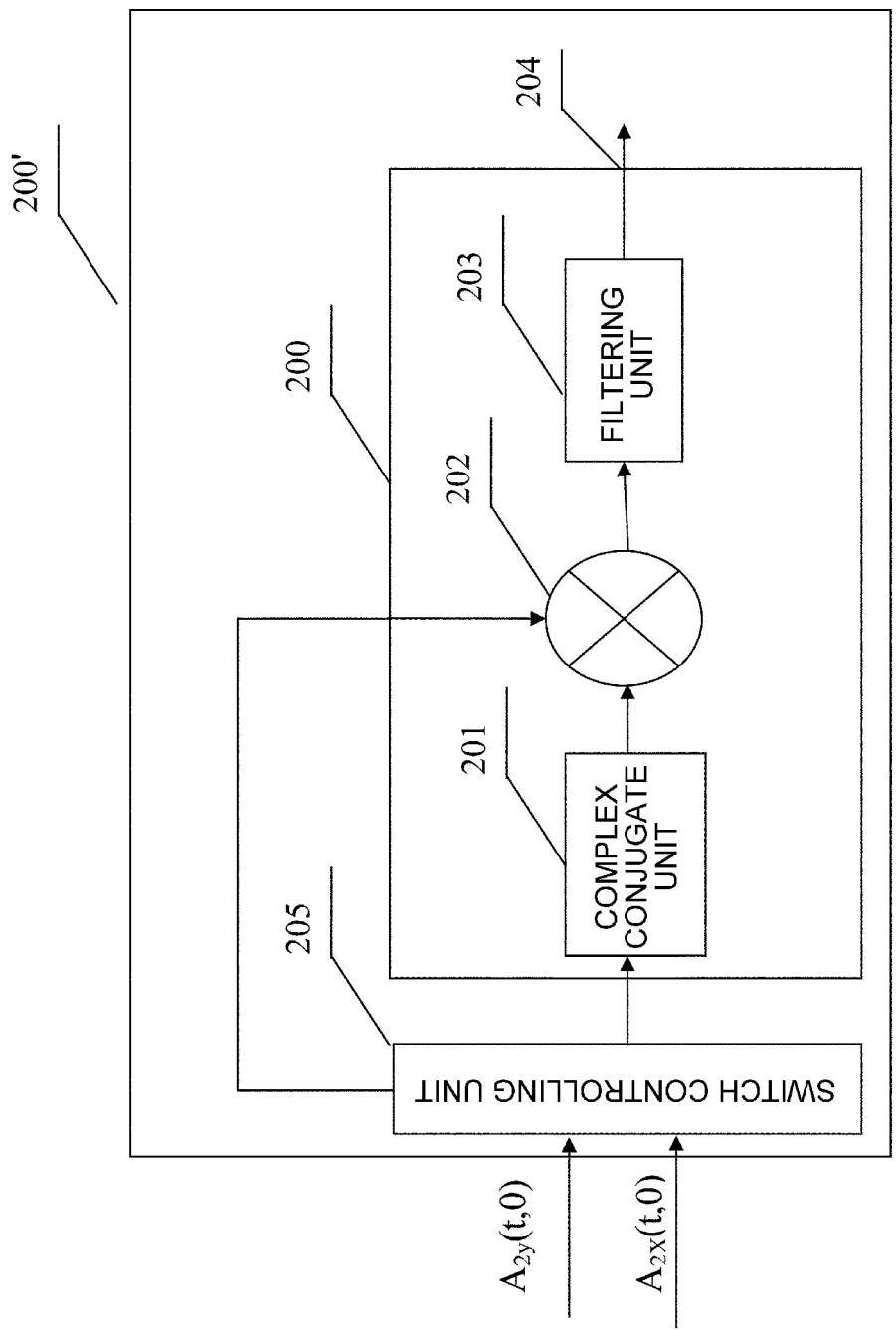
FIG. 3 shows another example of the crosstalk coefficient estimating apparatus according to the first embodiment of the present invention.

Accordingly, Wxy and Wyx can be sequentially calculated during specific embodiments. FIG. 3 shows another example of the crosstalk coefficient estimating apparatus according to the first embodiment of the present invention. The crosstalk coefficient estimating apparatus 200' as shown in FIG. 3 differs from the crosstalk coefficient estimating apparatus 200 as shown in FIG. 2 in the addition of a switch controlling unit 205. The switch controlling unit 205 controls the inputs into the complex conjugate unit 201 and the multiplying unit 202 to be respectively $A_{2y}(t,0)$ and $A_{2x}(t,0)$ or respectively $A_{2x}(t,0)$ and $A_{2y}(t,0)$, so as to calculate Wxy and Wyx respectively. The remaining component parts in FIG. 3 are identical with those in FIG. 2, so that these are not repetitively described.

Figure 4:
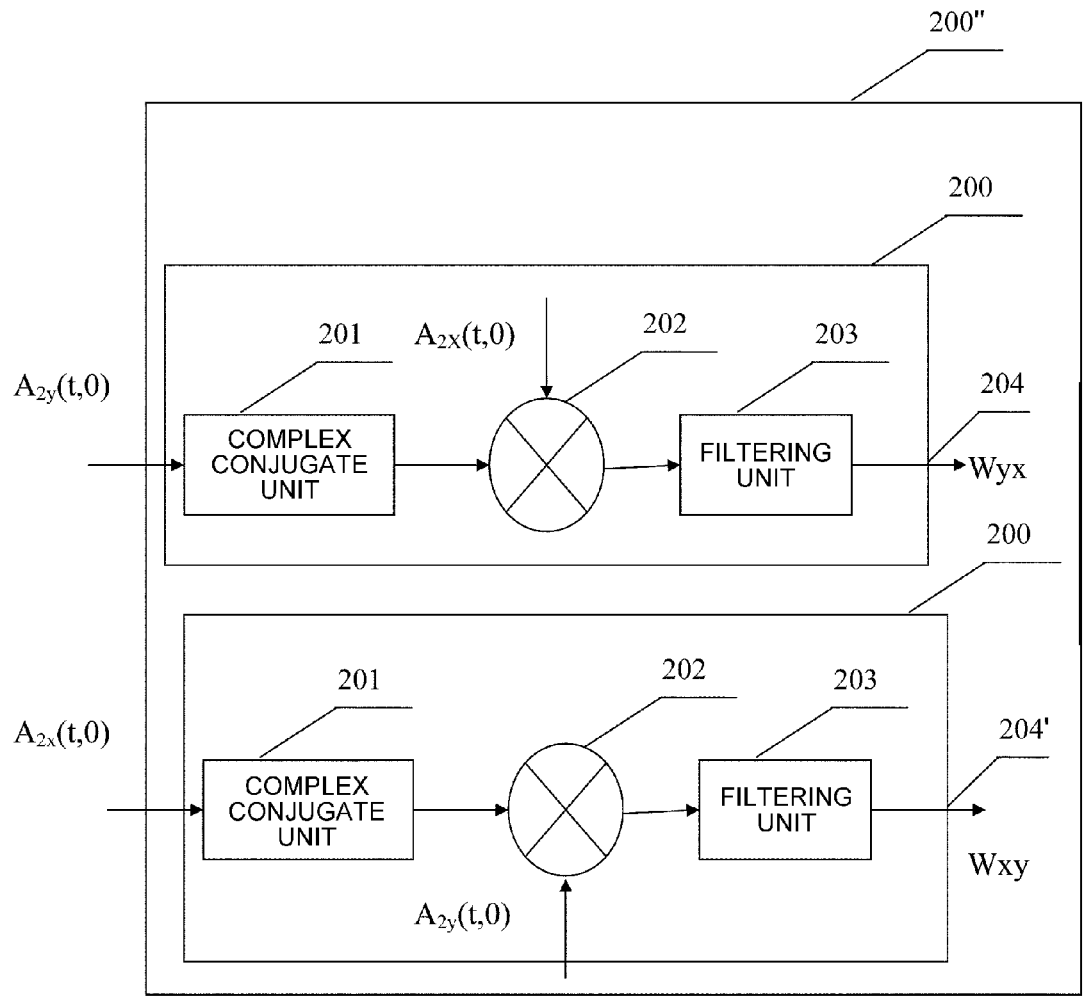
FIG. 4 shows yet another example of the crosstalk coefficient estimating apparatus according to the first embodiment of the present invention.

Moreover, it is also possible in specific embodiments to use two crosstalk coefficient estimating apparatuses 200 to calculate Wxy and Wyx in parallel. FIG. 4 shows yet another example of the crosstalk coefficient estimating apparatus 200" according to the first embodiment of the present invention. As shown in FIG. 4, as compared with the crosstalk coefficient estimating apparatus shown in FIG. 2, there is added another crosstalk coefficient estimating apparatus 200. As shown in FIG. 4, two crosstalk coefficient estimating apparatuses to which different inputs are input are used, whereby it is possible to simultaneously obtain the output signal 204 (Wyx) and the output signal 204' (Wxy).

The crosstalk coefficient estimating apparatuses as respectively shown in FIG. 3 and FIG. 4 are also referred to as single-span, single-pump crosstalk coefficient estimating apparatus 200' or 200".

The calculated crosstalk coefficient can be used to calculate system cost according to the following formula:

$$dB = 10 \log_{10}(1+\sigma_{Wyx}^2 \cdot SNR) \quad \text{(Formula 3)}$$

$\sigma_{Wyx}^2$ is the variance of the nonlinear polarization crosstalk coefficient, which can be obtained based on the output signal 204 (204'). SNR is signal-to-noise ratio, which is given from system parameters.

The Second Embodiment

Figure 5:
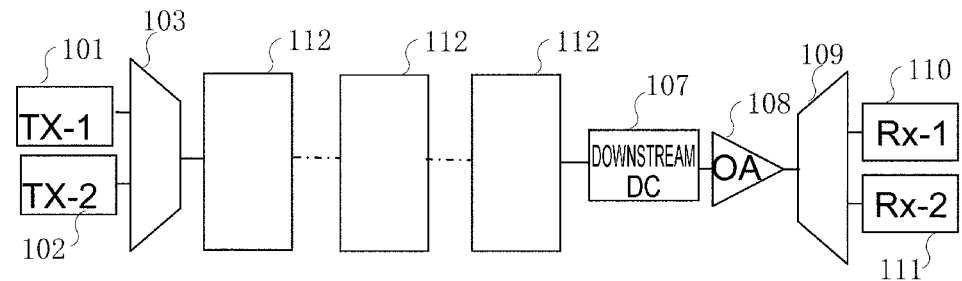
FIG. 5 shows an optical fiber transmission system, with respect to which the crosstalk coefficient estimating apparatus according to the second embodiment of the present invention estimates crosstalk coefficient.

The nonlinear polarization crosstalk coefficient estimating apparatus according to one embodiment of the present invention is described in the first embodiment with respect to a single-span, single-pump optical fiber transmission system. However, it is usual in actual application that the optical fiber transmission system does not have only a single span, but several spans instead. The second embodiment is directed to such a case. FIG. 5 shows an optical fiber transmission system, with respect to which the crosstalk coefficient estimating apparatus according to the second embodiment of the present invention is to estimate nonlinear polarization crosstalk coefficient.

The optical fiber transmission system as shown in FIG. 5 is substantially the same as the optical fiber transmission system shown in FIG. 1, and differs from the latter only in the fact that it has a plurality of spans 112. Similar reference numerals are used to indicate similar component parts, and their descriptions are omitted. As should be noted, parameters of the component parts in the various spans 112 may be different from each other, and, as previously mentioned, some of the component parts may be dispensed with.

Figure 6A:
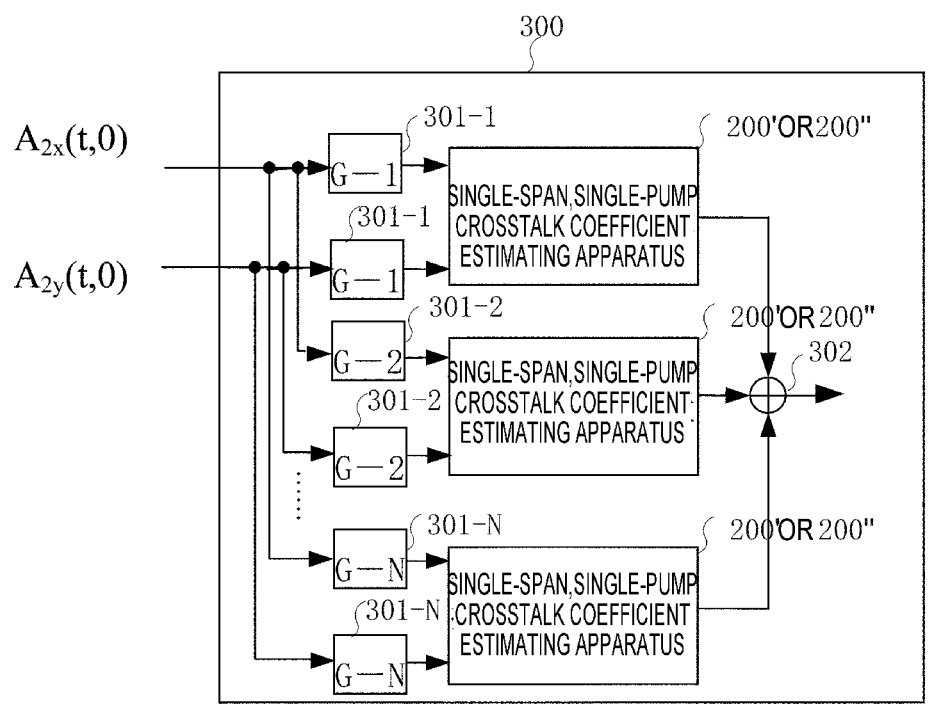
FIG. 6A shows an example of a crosstalk coefficient estimating apparatus usable for estimating crosstalk coefficient with respect to the optical fiber transmission system shown in FIG. 5.

FIG. 6A shows a crosstalk coefficient estimating apparatus usable for estimating crosstalk coefficient with respect to the optical fiber transmission system shown in FIG. 5. As shown in FIG. 6A, the crosstalk coefficient estimating apparatus 300 according to the second embodiment of the present invention includes: N sets of filter pairs 301, wherein N is a positive integer representing the number of optical transmission spans in the optical fiber transmission system; N single-span, single-pump crosstalk coefficient estimating apparatuses, which can be formed from the previously described crosstalk coefficient estimating apparatus 200' or 200"; and an adder 302.

According to the second embodiment of the present invention, it is possible to use the previously described crosstalk coefficient estimating apparatus 200' or 200", which is directed to the single span, to estimate the nonlinear polarization crosstalk coefficient introduced by each span. The inputs, $A_{2x}(t,Z_n)$ and $A_{2y}(t,Z_n)$, of each of the crosstalk coefficient estimating apparatus 200' or 200" are the waveforms of the pump input signals after having passed all the span prior to the span to which this crosstalk coefficient estimating apparatus 200' or 200" corresponds, and can be calculated by known methods via filters connected in series therewith. Zn indicates that $A_{2x}(t,Z_n)$ and $A_{2y}(t,Z_n)$ are at Zn of the transmission distance. For instance, if the chromatic dispersion effect in the system is taken into consideration, $A_{2x}(t,Z_n)$ and $A_{2y}(t,Z_n)$ can be obtained via a filter G from $A_{2x}(t,0)$ and $A_{2y}(t,0)$, wherein the transmission function of the filter G can be expressed as:

$$G(\omega) = e^{\frac{j\omega^2}{2}\sum_{i=0}^{N-1} D_i} \quad \text{(Formula 4)}$$

$D_i$ represents the residual chromatic dispersion before the $i^{th}$ span. As should be noted, as regards the first optical transmission span, since $D_0$ is 0, the filter pair is directly communicative, corresponding to a conductor wire. Accordingly, the filter is actually dispensable. To facilitate explanation, the directly communicative filter and the conductor wire that is equivalent to the directly communicative filter are still regarded as common filters, and are sequentially numbered.

As a system parameter of the system to which the crosstalk coefficient estimating apparatus is directed, the residual chromatic dispersion is known.

The summating unit 302 obtains the summation of outputs of N crosstalk coefficient estimating apparatuses 200' or 200", namely respectively calculates the summation of N Wxy and the summation of N Wyx output from N crosstalk coefficient estimating apparatuses 200' or 200".

Figure 6B:
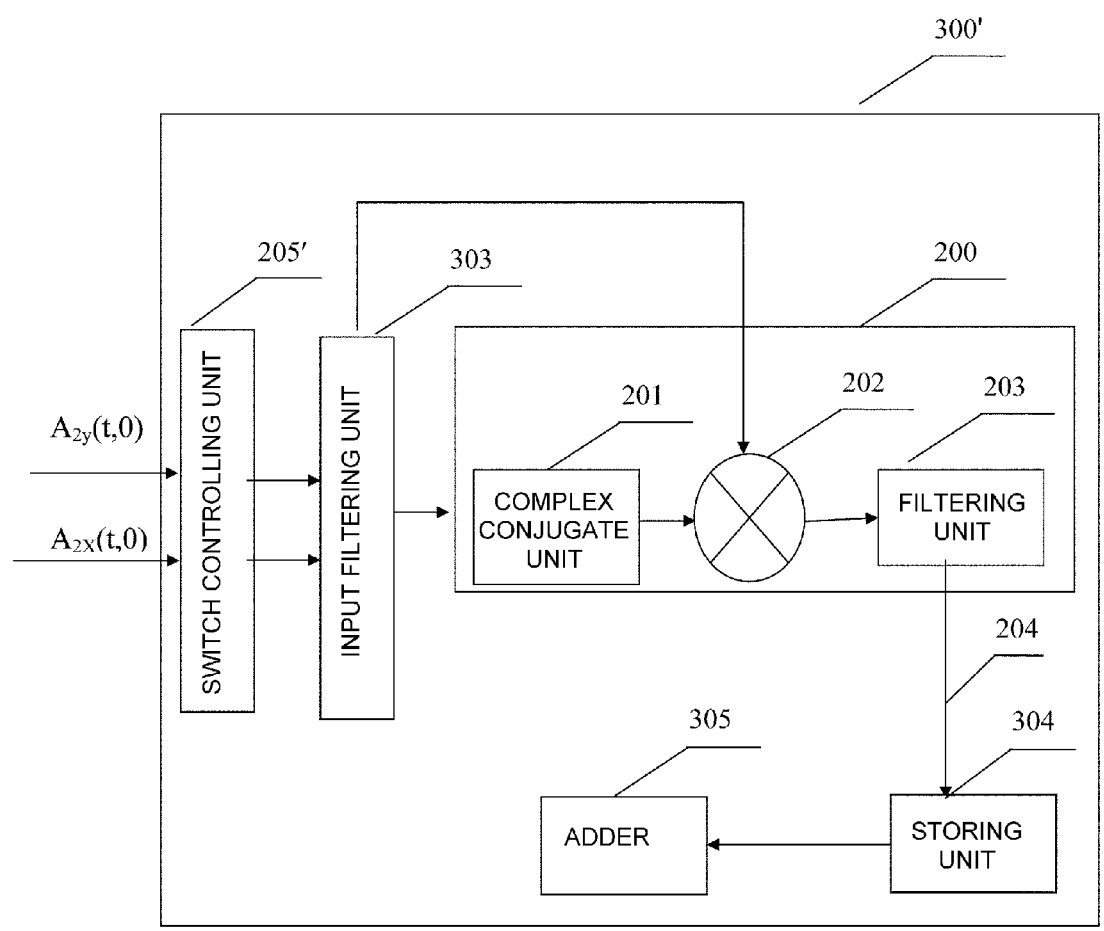
FIG. 6B shows another example of the crosstalk coefficient estimating apparatus usable for estimating crosstalk coefficient with respect to the optical fiber transmission system shown in FIG. 5.

FIG. 6B shows another example of the crosstalk coefficient estimating apparatus usable for estimating crosstalk coefficient with respect to the optical fiber transmission system shown in FIG. 5. As shown in FIG. 6B, the another example of the crosstalk coefficient estimating apparatus 300' according to the second embodiment of the present invention includes a switch controlling unit 205', an input filtering unit 303, a basic crosstalk coefficient estimating apparatus 200, a storing unit 304 and an adder 305.

The input filtering unit 303 includes N set of filter pairs 301 as shown in FIG. 6A.

The switch controlling unit 205' controls as to which set of filters of the N set of filter pairs in the input filtering unit 303 should the input signals $A_{2x}(t,0)$ and $A_{2y}(t,0)$ of the two polarization states of the pump light be input, and controls the inputs into the complex conjugate unit 201 and the multiplier 202 with respect to the signal output from this set of filter pairs. By seriatim inputting the input signals $A_{2x}(t,0)$ and $A_{2y}(t,0)$ of the two polarization states of the input pump light into each set of filter pairs of the input filtering unit 303, and by passing through the basic crosstalk coefficient estimating apparatus 200, it is possible to obtain N crosstalk coefficients Wxy and N crosstalk coefficients Wyx. Because these crosstalk coefficients Wxy and Wyx are not simultaneously obtained, these can be stored in the storing unit 304 temporarily, and then be summated.

Summation can also be performed by the following procedure:
(1) storing the first Wxy or Wyx as obtained in the storing unit 304;
(2) adding the newly obtained Wxy or Wyx to the Wxy or Wyx stored in the storing unit 304 via the adder 305;
(3) storing the summation obtained in step (2) in the storing unit 304 to replace the Wxy or Wyx stored in the storing unit 802; and
(4) repeating steps (2) and (3).

In this embodiment, the storing unit 304 and the adder 305 correspond to an embodiment of the summating unit in the present invention.

Moreover, the switch controlling unit 205 can also be arranged downstream of the input filtering unit 303 in the crosstalk coefficient estimating unit 300' as shown in FIG. 6B. In this case, the input signals $A_{2x}(t,0)$ and $A_{2y}(t,0)$ are simultaneously input into each filter pair in the input filtering unit 303, but the switch controlling unit 205' controls as to which set of filter in the filter pairs of the input filtering unit 303 is to output, and controls the inputs into the complex conjugate unit 201 and the multiplier 202 with respect to the signal output from this set of filter.

The crosstalk coefficient estimating apparatuses 300 and 300' as shown in FIGS. 6A and 6B are also referred to as multi-span, multi-pump crosstalk coefficient estimating apparatuses 300 and 300'.

The Third Embodiment

Crosstalk coefficient estimating apparatuses according to the embodiments of the present invention are described in the first and second embodiments with respect to an optical fiber transmission system with a single pump channel transmitter. But in practical application it is usual for the optical fiber transmission system to have not only a single pump channel transmitter, but a plurality of pump channel transmitters instead. The third embodiment is directed to this case for explanation.

Figure 7:
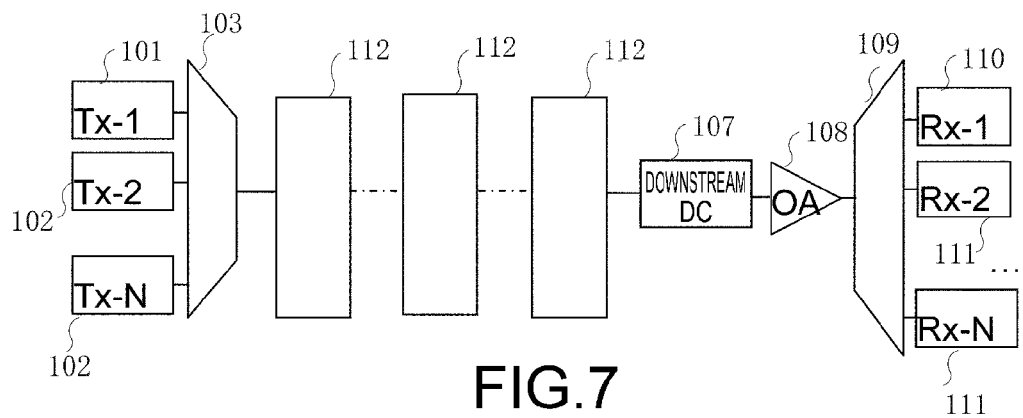
FIG. 7 shows an optical fiber transmission system, with respect to which the crosstalk coefficient estimating apparatus according to the third embodiment of the present invention is to estimate nonlinear polarization crosstalk coefficient.

FIG. 7 shows an optical fiber transmission system, with respect to which the crosstalk coefficient estimating apparatus according to the third embodiment of the present invention is to estimate nonlinear polarization crosstalk coefficient.

The optical fiber transmission system as shown in FIG. 7 differs from the optical fiber transmission system shown in FIG. 5 in the addition of a pump channel transmitter 102 as well as the corresponding addition of a pump channel receiver 111.

Figure 8A:
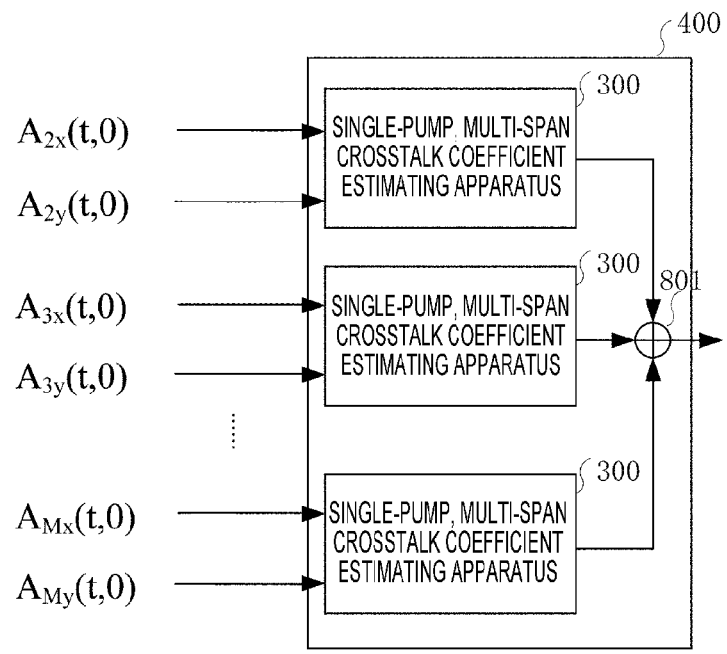
FIG. 8A shows an example of the crosstalk coefficient estimating apparatus according to the third embodiment of the present invention.

FIG. 8A shows an example of the crosstalk coefficient estimating apparatus according to the third embodiment of the present invention. As shown in FIG. 8A, the example of the crosstalk coefficient estimating apparatus 400 according to the third embodiment of the present invention includes an adder 801 and M single-pump, multi-span crosstalk coefficient estimating apparatuses. M here is a positive integer, representing the number of pump channel transmitters in the optical fiber transmission system. The M single-pump, multi-span crosstalk coefficient estimating apparatuses can be realized as the previously described crosstalk coefficient estimating apparatus 300 or 300'.

The adder 801 obtains the summation of outputs of M crosstalk coefficient estimating apparatuses 300 or 300', namely respectively calculates the summation of M Wxy and the summation of M Wyx output from M crosstalk coefficient estimating apparatuses 300 or 300'.

As apparent, if the M crosstalk coefficient estimating apparatuses 300 or 300' are changed to M crosstalk coefficient estimating apparatuses 200' or 200'', it is possible to calculate the crosstalk coefficient of the multi-pump, single-span optical fiber transmission system.

Figure 8B:
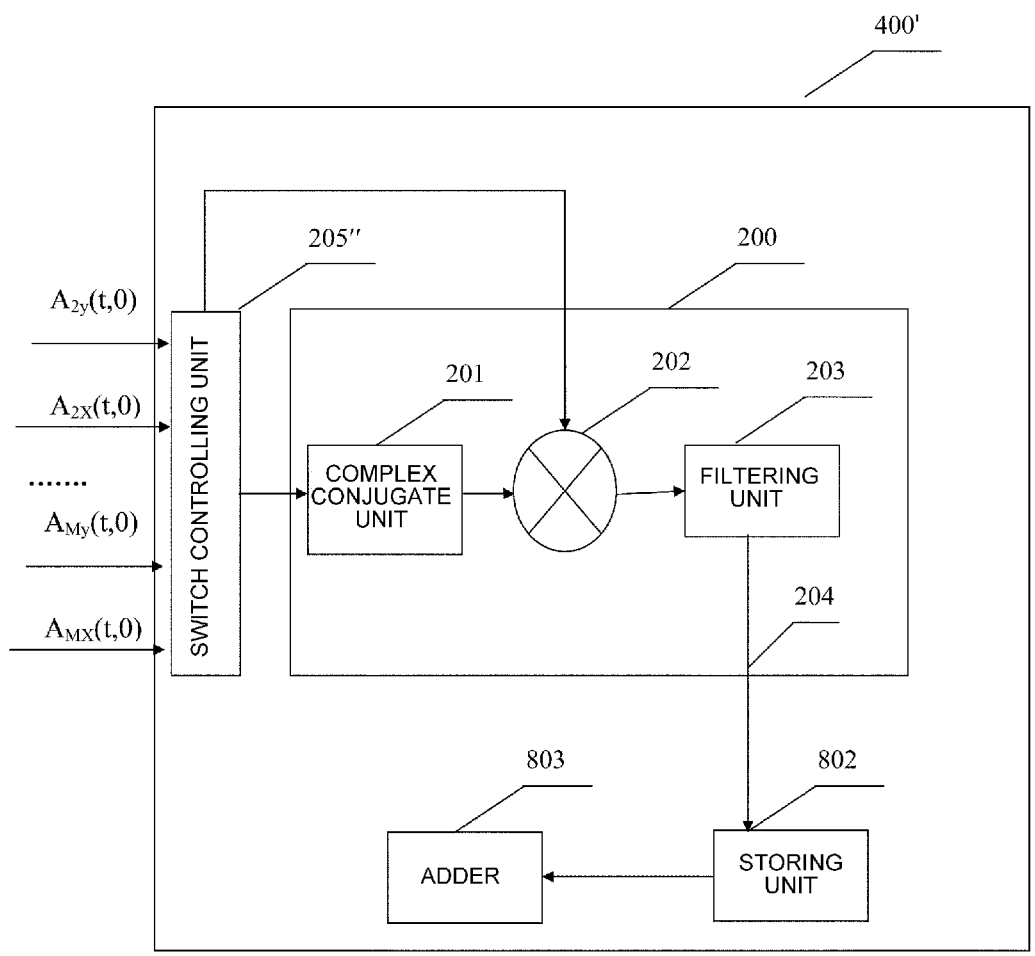
FIG. 8B shows another example of the crosstalk coefficient estimating apparatus according to the third embodiment of the present invention.

FIG. 8B shows another example of the crosstalk coefficient estimating apparatus according to the third embodiment of the present invention. As shown in FIG. 8B, the another example of the crosstalk coefficient estimating apparatus 400' according to the third embodiment of the present invention includes a switch controlling unit 205'', a basic crosstalk coefficient estimating apparatus 200, a storing unit 802 and an adder 803.

The switch controlling unit 205'' is input with signals of M set of pump lights. Signals of the $i^{th}$ set of pump lights include the signal (such as $A_{ix}(t,0)$) of one polarization state of the set of pump lights and the signal (such as $A_{iy}(t,0)$) of another polarization state of the $i^{th}$ set of pump lights, where $2<i<=M$. The switch controlling unit 205'' inputs seriatim the signals of the input M sets of pump lights into the basic crosstalk signal estimating apparatus 200, and, as previously mentioned, controls as to whether the signal of each polarization state is to be input into the complex conjugate unit 201 or the multiplier 202, so that, after passing through the basic crosstalk coefficient estimating apparatus 200, it is possible to obtain M crosstalk coefficients Wxy and M crosstalk coefficients Wyx. Because these Wxy and Wyx are sequentially, rather than simultaneously, obtained, these can be stored in the storing unit 802 temporarily, and then be summated. Summation can also be performed by the following procedure:
(1) storing the first Wxy or Wyx as obtained in the storing unit 802;
(2) adding the newly obtained Wxy or Wyx to the Wxy or Wyx stored in the storing unit 802 via the adder 803;
(3) storing the summation obtained in step (2) in the storing unit 802 to replace the Wxy or Wyx stored in the storing unit 802; and
(4) repeating steps (2) and (3).

In this embodiment, the storing unit 802 and the adder 803 correspond to the summating unit in the present invention.

The crosstalk coefficient estimating apparatus 400 as shown in FIG. 8A is also referred to as multi-pump, multi-span crosstalk coefficient estimating apparatus 400 (when the crosstalk coefficient estimating apparatus 300 or 300' is used). The crosstalk coefficient estimating apparatus 400' as shown in FIG. 8B is also referred to as multi-pump, single-span crosstalk coefficient estimating apparatus 400'.

The Fourth Embodiment

In the above embodiments, the transmission functions of both the low-pass filter 203 and the filter G are set in accordance with the system parameters of the optical fiber transmission system to which the crosstalk coefficient estimating apparatus is directed. Accordingly, it is possible to enhance the adaptability of the crosstalk coefficient estimating apparatus by adding a system parameter inputting unit and a filter controlling unit.

Figure 9A:
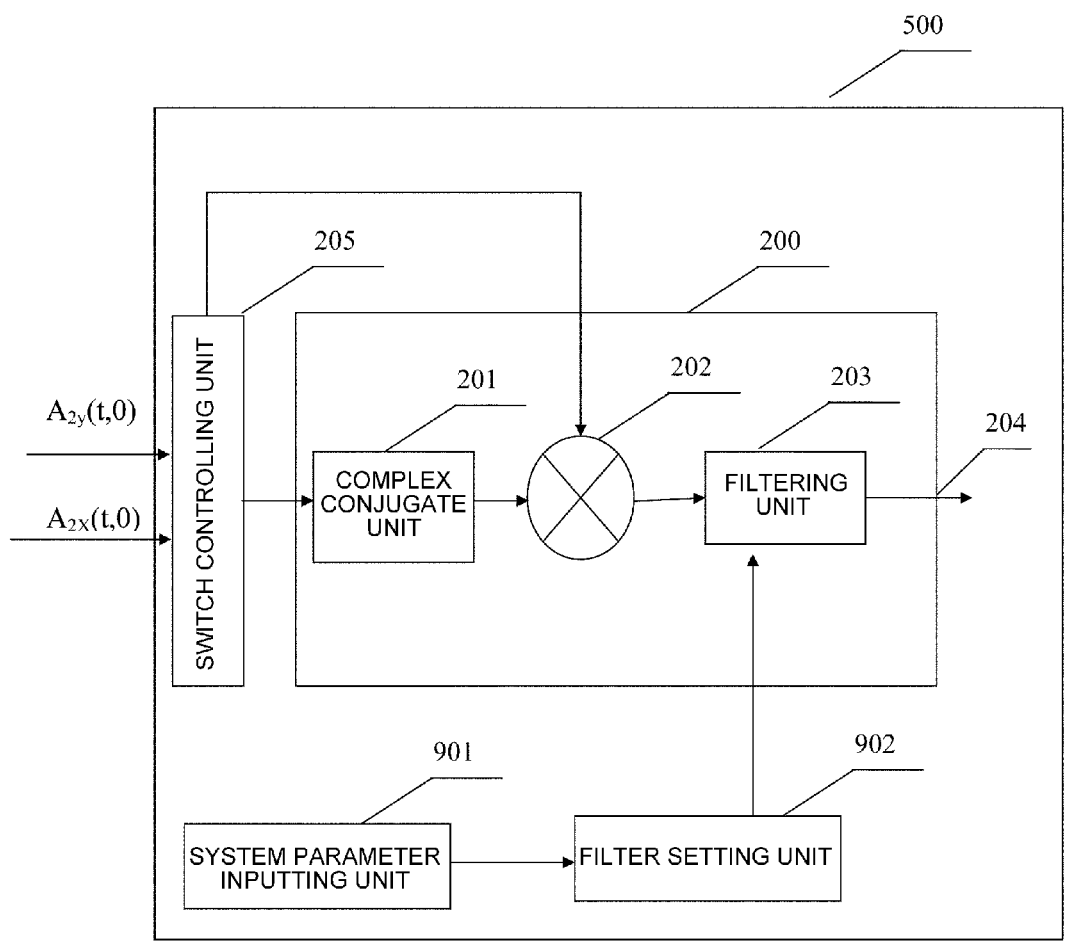
FIG. 9A shows an example of the crosstalk coefficient estimating apparatus according to the fourth embodiment of the present invention.

FIG. 9A shows a example of the crosstalk coefficient estimating apparatus according to the fourth embodiment of the present invention. The crosstalk coefficient estimating apparatus 500 as shown in FIG. 9A differs from the crosstalk coefficient estimating apparatus shown in FIG. 3 in the additions of a system parameter inputting unit 901 and a filter setting unit 902. The system parameter inputting unit 901 inputs system parameters of the optical fiber transmission system to which the crosstalk coefficient estimating apparatus is directed, and the filter setting unit 902 sets the filtering unit 203 in accordance with the system parameters input from the system parameter inputting unit 901.

Figure 9B:
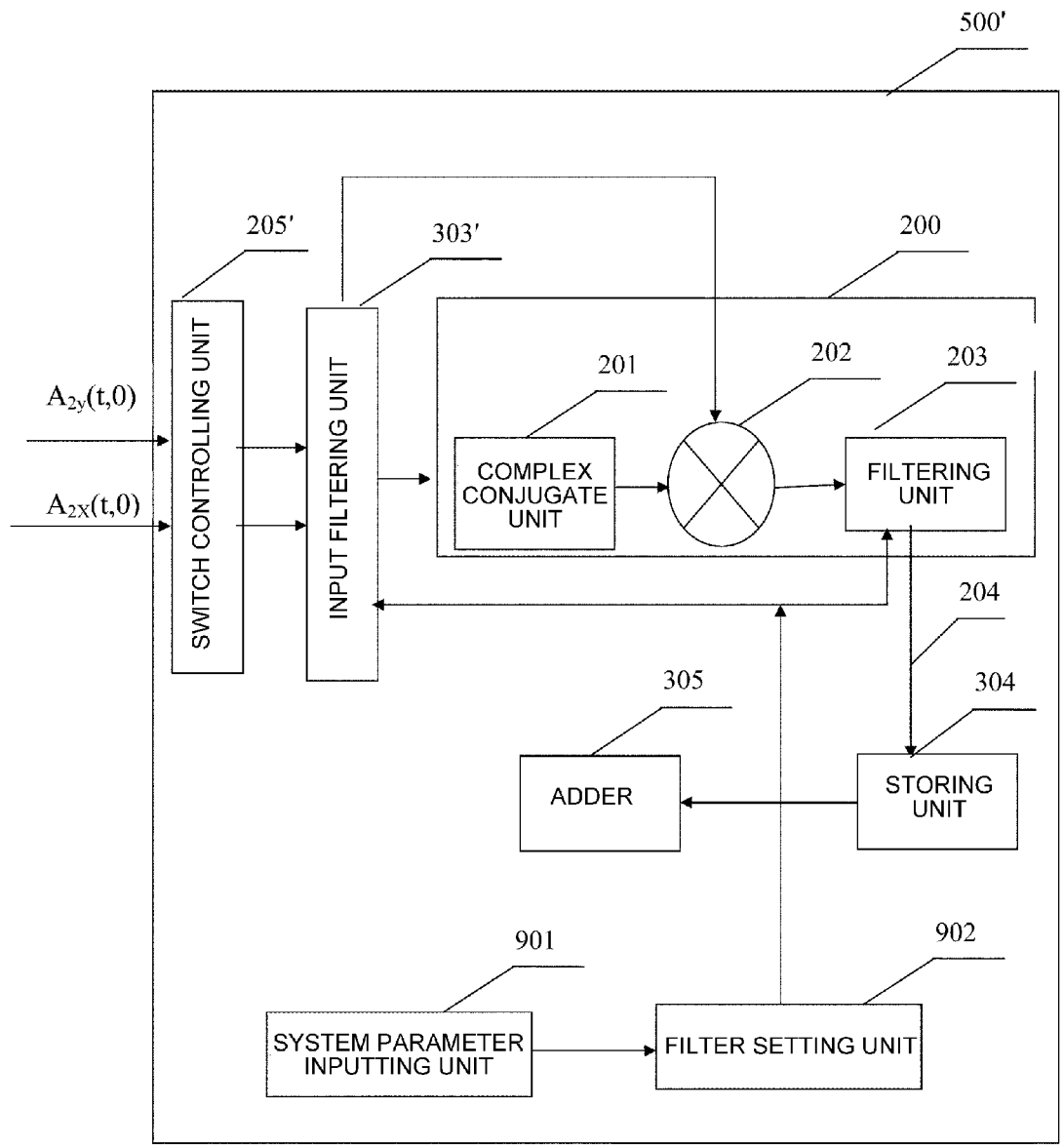
FIG. 9B shows another example of the crosstalk coefficient estimating apparatus according to the fourth embodiment of the present invention.

FIG. 9B shows another example of the crosstalk coefficient estimating apparatus according to the fourth embodiment of the present invention. The crosstalk coefficient estimating apparatus 500' as shown in FIG. 9B differs from the crosstalk coefficient estimating apparatus shown in FIG. 6 in the additions of a system parameter inputting unit 901 and a filter setting unit 902, and in the replacement of the input filtering unit 303 by an input filtering unit 303'. The system parameter inputting unit 901 inputs system parameters of the optical fiber transmission system to which the crosstalk coefficient estimating apparatus is directed, such as the length of the optical fiber of each optical transmission span, the nonlinear coefficient, the group rate chromatic dispersion coefficient, the attenuation coefficient, the differential value between central frequencies of the detection channel and the pump channel, and the residual chromatic dispersion of each optical transmission span. The filter setting unit 902 sets the filter 203 and each of the filters of the input filtering unit 303' in accordance with the system parameters input from the system parameter inputting unit 901. Due to the presence of the filter setting unit 902, the input filtering unit can also be formed of only one set of filters in this embodiment. The filter setting unit 902 adjusts the transmission function of this set of filter pair (see Formula 4 for instance) in accordance with the optical transmission span directed to, thus also serving the function of a plurality of filter pairs.

In this embodiment, the switch controlling unit 205' respectively inputs the input signals $A_{2x}(t,0)$ and $A_{2y}(t,0)$ of the two polarization states of the input pump light into the input filtering unit 303' whose transmission function has been differently set, and controls the inputs into the complex conjugate unit 201 and the multiplier 202 with respect to the signal output from the input filtering unit 303'. By seriatim inputting the input signals $A_{2x}(t,0)$ and $A_{2y}(t,0)$ of the two polarization states of the input pump light into the input filtering unit 303', and by passing through the basic crosstalk coefficient estimating apparatus 200, it is possible to obtain N crosstalk coefficients Wxy and N crosstalk coefficients Wyx. Subsequently, summation is performed via the storing unit 304 and the adder 305 to obtain the final crosstalk coefficients Wyx and Wxy.

Figure 9C:
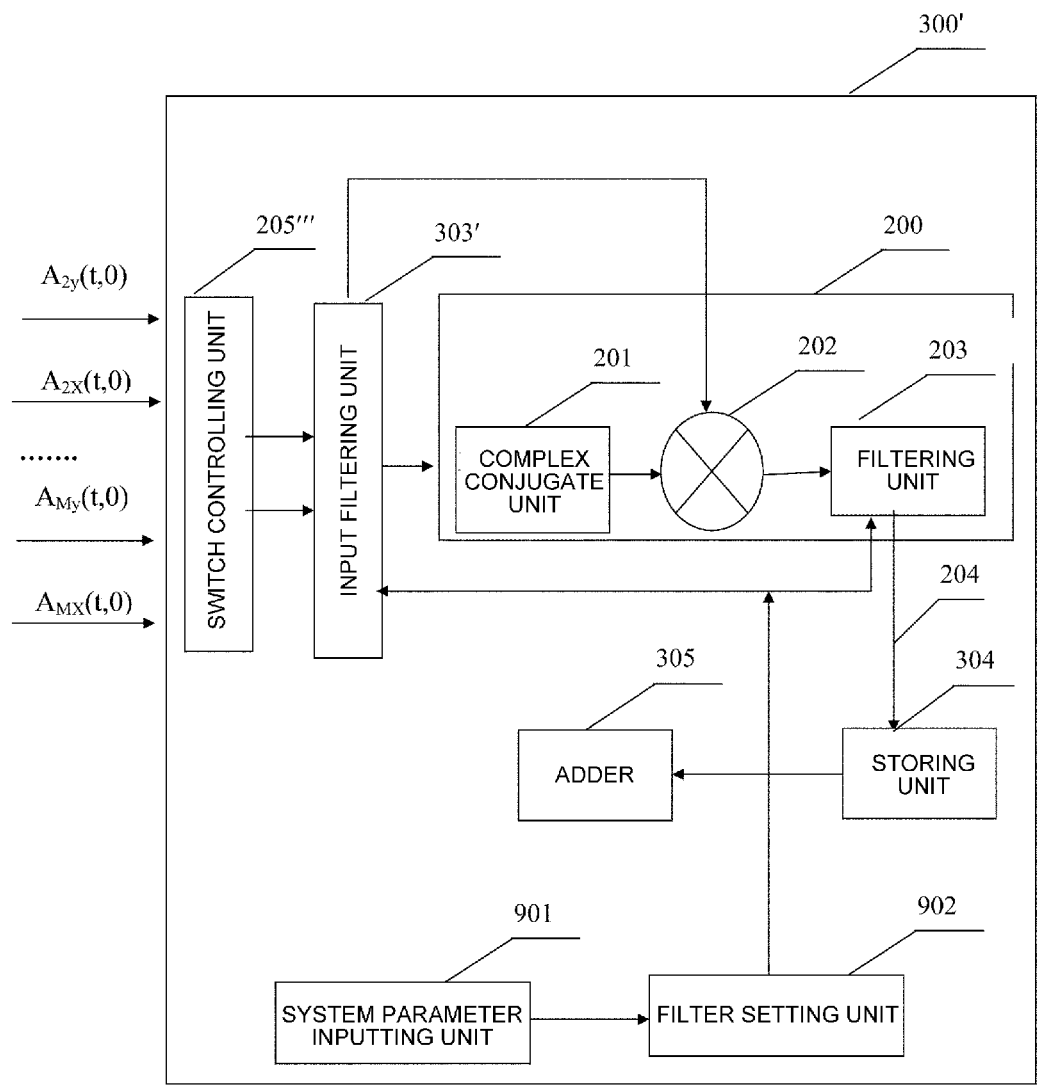
FIG. 9C shows yet another example of the crosstalk coefficient estimating apparatus according to the fourth embodiment of the present invention.

FIG. 9C shows yet another example of the crosstalk coefficient estimating apparatus according to the fourth embodiment of the present invention. The crosstalk coefficient estimating apparatus 500" as shown in FIG. 9C differs from the crosstalk coefficient estimating apparatus shown in FIG. 9B in the replacement of the switch controlling unit 205' by a switch controlling unit 205''', and the signal input into the switch controlling unit 205''' is the signal of M set of pump lights.

In accordance with certain control rules, the switch controlling unit 205''' inputs the signals of the input M set of pump lights seriatim into the input filtering unit 303' and the basic crosstalk coefficient estimating apparatus 200 whose transmission functions have been differently set, and, as previously mentioned, controls as to whether the signal of each polarization state is to be input into the complex conjugate unit 201 or the multiplier 202. Since the transmission function of the filter inputting unit 303' is changed under control of the filter setting unit 902, and the signals of the M set of pump lights are input seriatim into the input filtering unit 303' whose transmission function has been differently set, it is possible, after passing through the basic crosstalk coefficient estimating apparatus 200, to obtain M×N crosstalk coefficients Wxy and M×N crosstalk coefficients Wyx.

Summation is performed by the storing unit 304 and the adder 305 to obtain the final crosstalk coefficients Wyx and Wxy.

The crosstalk coefficient estimating apparatus according to the fourth embodiment can flexibly estimate crosstalk coefficients with respect to various optical fiber transmission systems, and can conveniently re-estimate crosstalk coefficients when system parameters of the optical fiber transmission systems are changed.

Figure 10:
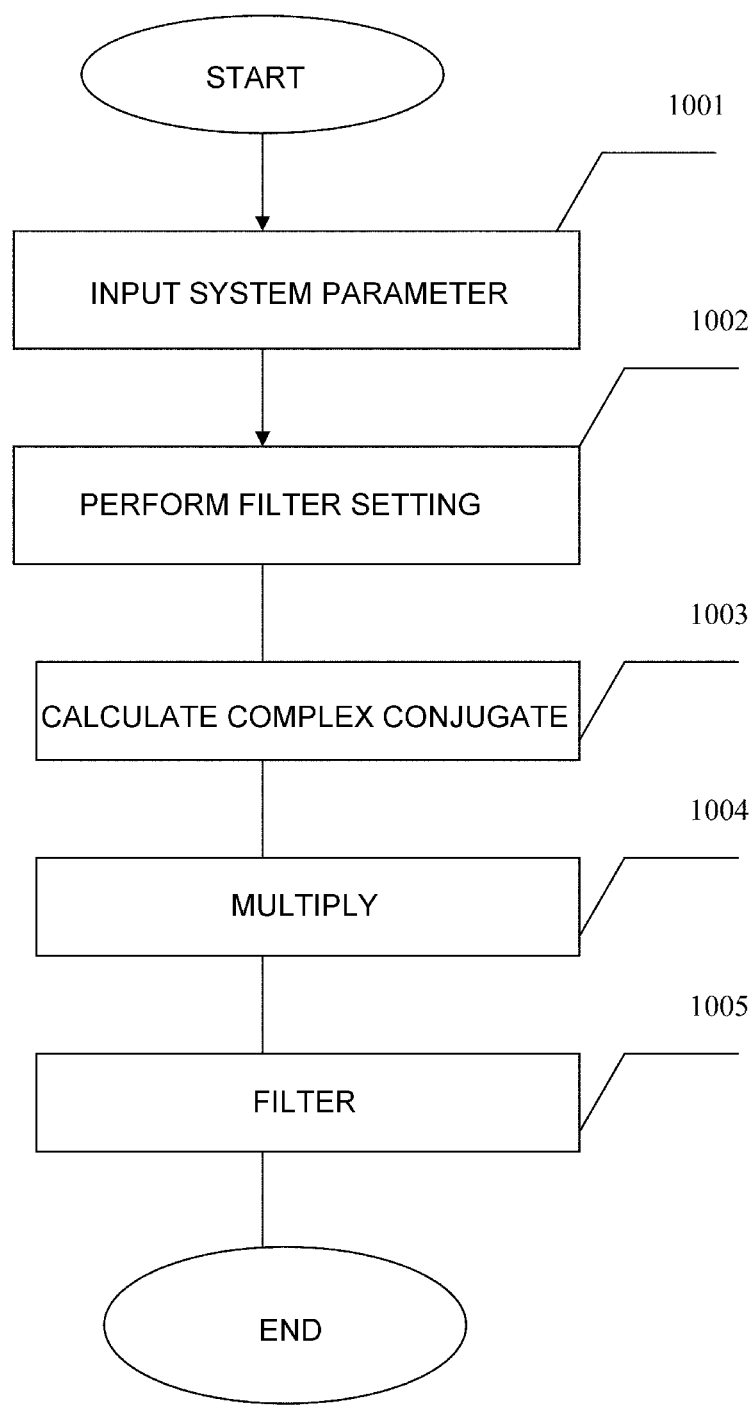
FIG. 10 shows a crosstalk coefficient estimating method according to one embodiment of the present invention.

FIG. 10 shows a crosstalk coefficient estimating method according to one embodiment of the present invention. As shown in FIG. 10, in the crosstalk coefficient estimating method according to one embodiment of the present invention, firstly in Step 1001, system parameters of the system to which the required crosstalk coefficient is directed are inputted. the system parameters are for example, the input signals of the two polarization states of the pump light, the length of the optical fiber 105 of the optical transmission span, the nonlinear coefficient of the optical fiber 105, the group rate chromatic dispersion coefficient of the optical fiber 105, the attenuation coefficient of the optical fiber 105, and the differential value $\Delta\omega$ between central frequencies of the detection channel and the pump channel. Then, filtering setting is performed in Step 1002 to set the transmission function of the filter (such as the filter of the filtering unit 203). The transmission function can for instance be shown in the foregoing Formula 2. Subsequently, in Step 1003, a conjugate signal of the signal of one polarization state in the input signals of the two polarization states of the pump light is calculated. In Step 1004, the complex conjugate signal of the signal of one polarization state in the input signals of the two polarization states of the pump light as obtained in Step 1003 is multiplied with the signal of another polarization state in the input signals of the two polarization states of the pump light, and the multiplication result of Step 1004 is subjected to filtering in Step 1005. In the filtering in Step 1005, the transmission function of the filter is set in Step 1002.

According to the crosstalk coefficient estimating method shown in FIG. 10, it is possible to estimate the crosstalk coefficient of the single-pump, single-band system.

Steps 1003 to 1005 can be repeated, each time obtaining the complex conjugate for the signals of different polarization states to be then multiplied with the signal of another polarization state, so that it is possible to obtain crosstalk coefficients of crosstalk of the pump light on the signals of different polarization states of the detection light.

Figure 11:
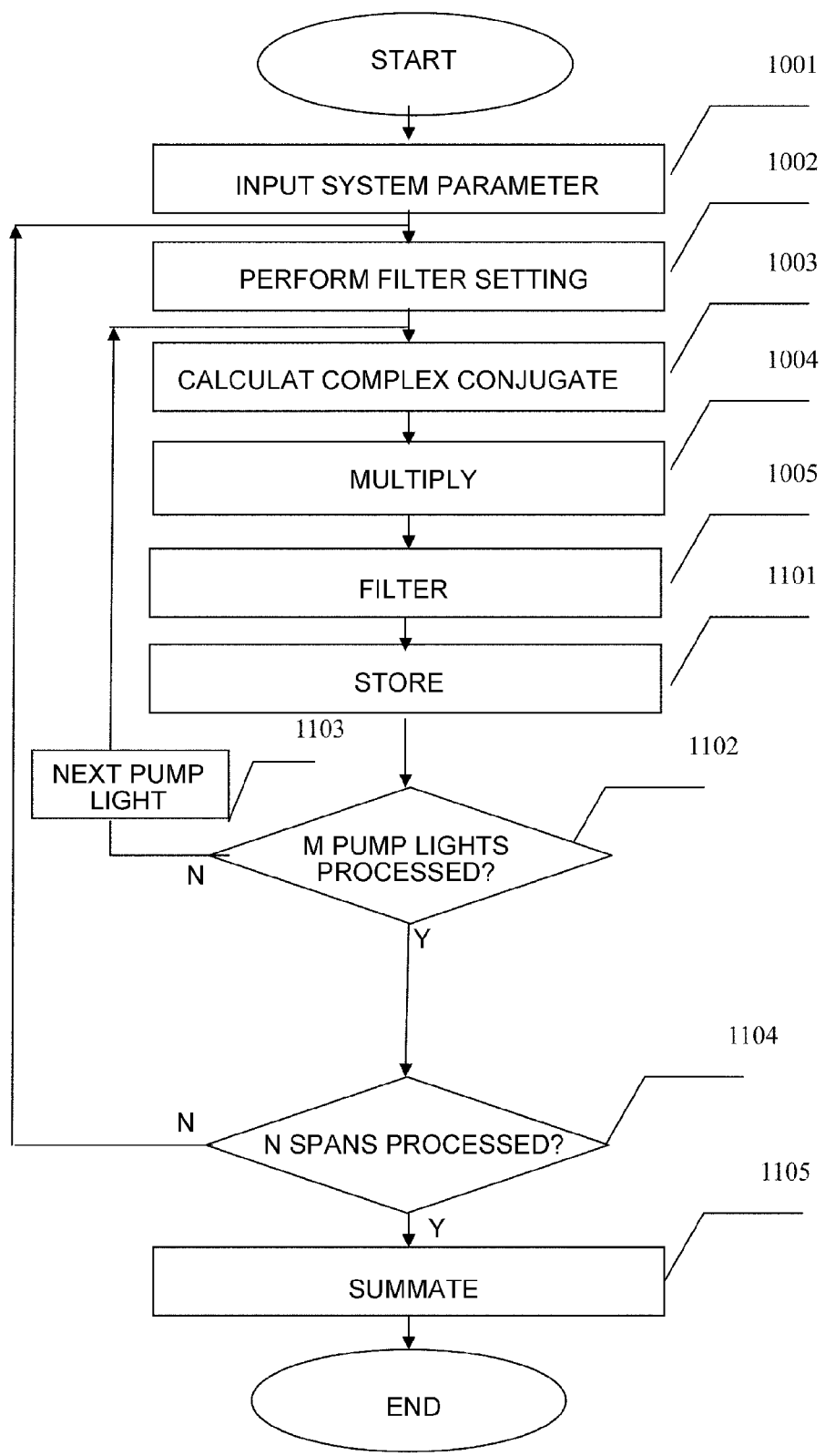
FIG. 11 shows a crosstalk coefficient estimating method according to another embodiment of the present invention.

FIG. 11 shows a crosstalk coefficient estimating method according to another embodiment of the present invention. As shown in FIG. 11, in the crosstalk coefficient estimating method according to another embodiment of the present invention, Steps 1001 to 1005 are identical with those shown in FIG. 10, so that these are not repetitively described here. In Step 1101, crosstalk coefficients Wxy and Wyx obtained by filtering in Step 1005 are stored. Then, it is determined in Step 1102 as to whether all signals of the M set of pump lights have been processed. If they are not all processed (Step 1102, NO), the signal of the next pump light is accessed in (Step 1103), and Steps 1003, 1004, 1005 and 1101 are repeated, so as to obtain M crosstalk coefficients Wyx and M crosstalk coefficients Wxy. If it is determined in Step 1102 that the signals of the M set of pump lights have all been processed (Step 1102, YES), it is determined in Step 1104 as to whether N optical transmission spans have all been processed; if the N optical transmission spans are not all processed (Step 1104, NO), Steps 1002-1005 and 1101-1104 are repeated until it is determined in Step 1104 that the N optical transmission spans have all been processed. Summation is subsequently performed in Step 1105, so as to obtain the final crosstalk coefficients Wxy and Wyx of the detection light of the optical fiber transmission system directed to.

The flowchart of FIG. 11 is merely exemplary in nature, rather than restrictive of the present invention. For instance, the summation in Step 1105 can also directly follow Step 1101. Moreover, although M pump lights are seriatim processed firstly, and N spans are only subsequently processed in the flowchart of FIG. 11, it is also possible to firstly process the N spans and then process the M pump lights seriatim.

According to the crosstalk coefficient estimating method shown in FIG. 11, it is possible to estimate the crosstalk coefficient of a multi-pump, multi-span system, and also possible to estimate the crosstalk coefficient of a single-pump, multi-span system and the crosstalk coefficient of a multi-pump, single-span system.

The constituent modules, units and subunits in the aforementioned apparatuses as well as the steps in the aforementioned methods can be configured by software, firmware, hardware, or a combination thereof. Specific means or modes usable for the configuration are well-known to persons skilled in the art, and are hence not redundantly described here. In the case of implementation through software or firmware, programs constituting the software are installed from a storage medium or a network to a computer having a dedicated hardware structure (such as the general-purpose computer 1200 as shown in FIG. 12), and the computer, when installed with various programs, is capable of executing various functions.

Figure 12:
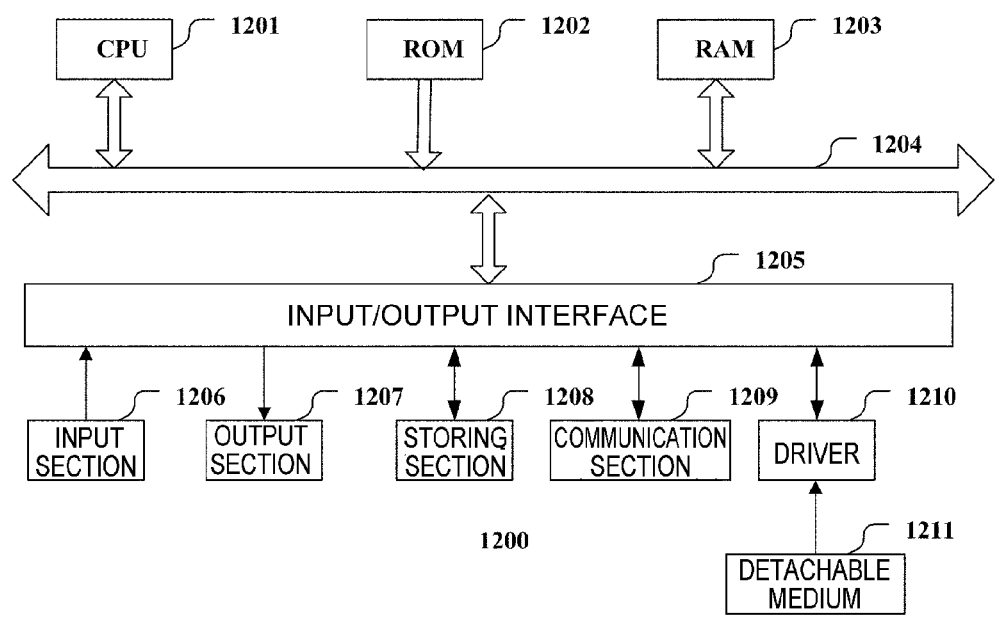
FIG. 12 is a schematic block diagram showing a computer usable for implementing the methods and apparatuses according to the embodiments of the present invention.

FIG. 12 is a schematic block diagram showing a computer usable for implementing the methods and apparatuses according to the embodiments of the present invention.

In FIG. 12, a central processing unit (CPU) 1201 executes various processes in accordance with programs stored in a read-only memory (ROM) 1202 or programs loaded from a storing section 1208 to a random access memory (RAM) 1203. Data required when the CPU 1201 executes various processes are further stored in the RAM 1203 upon practical demand. The CPU 1201, the ROM 1202 and the RAM 1203 are connected to each other via a bus 1204. It is also possible to connect an input/output interface 1205 to the bus 1204 on demand.

As practically demanded, the following component parts can be connected to the input/output interface 1205: an input section 1206 (including keyboard, mouse, etc.), an output section 1207 (including display such as cathode ray tube (CRT), liquid crystal display (LCD) etc., and speaker), the storing section 1208 (including hard disk, etc.), and a communication section 1209 (including network interface card such as LAN card, and modem, etc.). The communication section 1209 executes communication processes via such a network as the Internet. A driver 1210 can also be connected to the input/output interface 1205 on demand. A detachable medium 1211, such as a magnetic disk, an optical disk, a magneto-optical disk, a semiconductor memory etc., can be mounted on the driver 1210 on demand, enabling computer programs read therefrom to be installed in the storing section 1208 on demand. The computer can only have the CPU 1201, the ROM 1202 and the RAM 1203 connected via the bus 1204.

In the case the aforementioned series of processes are implemented via software, programs constituting the software are installed from such a network as the Internet or such a storage medium as the detachable medium 1211.

As should be aware to persons skilled in the art, the storage medium is not limited to the detachable medium 1211 storing programs therein and distributing to provide users with programs separately from the apparatus as shown in FIG. 12. Examples of the detachable medium 1211 include magnetic disk (including floppy Disk®), optical disk (including optical disk read-only memory (CD-ROM) and digital versatile disk (DVD)), magneto-optical disk (including mini-disk (MD)®) and semiconductor memory. Alternatively, the storage medium can be the ROM 1202, or a hard disk included in the storing section 1208, in which are stored programs to be distributed together with the apparatus containing them to users.

The present invention further proposes a program product storing therein a machine-readable instruction code. When being read and executed by a machine (the computer as illustrated above, for example), the instruction code is capable of executing the methods according to the embodiments of the present invention.

Correspondingly, the storage medium that carries the program product storing therein a machine-readable instruction code is also subsumed in the disclosure of the present invention. The storage medium includes, but is not limited to, floppy disk, optical disk, magneto-optical disk, memory card, and memory bar, etc.

As should be noted, when the crosstalk coefficient estimating apparatus shown in FIG. 2 is executed by a computer that executes a particular program, programs and progresses that realize the basic crosstalk coefficient estimating apparatus of FIG. 2 may have a plurality of examples, so that the storing units in FIG. 6B, FIG. 8B and FIG. 9B can be dispensed with under such circumstance.

Excursus 1: A crosstalk coefficient estimating apparatus, for estimating a crosstalk coefficient of crosstalk inflicted on one channel of an optical fiber transmission system comprising two or more channels, the crosstalk coefficient estimating apparatus comprising: a complex conjugate unit, for obtaining a complex conjugate signal for signal in one polarization-state of another channel other than said one channel; a multiplying unit, for multiplying the complex conjugate signal obtained by the complex conjugate unit with signal in another polarization-state of the another channel; and a filter, for filtering the multiplication result of the multiplying unit to obtain a crosstalk coefficient of crosstalk inflicted on the signal in one polarization-state of said one channel, wherein a transmission function of the filter is set according to system parameters of the optical fiber transmission system.

Excursus 2: The crosstalk coefficient estimating apparatus according to Excursus 1, wherein the system parameters are length L, nonlinear coefficient γ, rate dispersion coefficient β, attenuation coefficient α for the fiber of an optical transmission span of the optical fiber transmission system, and a difference Δw between central frequencies of said one channel and the another channel, and wherein the transmission function of the filter is:

$$H(\omega) = -\frac{j8\gamma}{9} \frac{e^{(-\alpha+j\omega\beta_2\Delta\omega)L}-1}{-\alpha+j\omega\beta_2\Delta\omega}.$$

Excursus 3: The crosstalk coefficient estimating apparatus according to Excursus 1, further comprising a switch controller that controls signal in which polarization-state of the another channel is input to the complex conjugate unit, to obtain crosstalk coefficients of crosstalk inflicted on the signals in two polarization-state of said one channel.

Excursus 4: The crosstalk coefficient estimating apparatus according to Excursus 1, wherein the optical fiber transmission system comprises N optical transmission spans, where N is a positive integer greater than 1, the crosstalk coefficient estimating apparatus further comprising: an input filter that comprises N input filters, the N input filters respectively filtering input signals thereof according to different transmission functions, to obtain N sets of signals respectively corresponding to the optical transmission spans; a switch controller, for controlling to input the signal of the another channel into each of the plurality of input filters, and for controlling signal in which polarization-state in the signals obtained by each of the input filters of the input filter enters the complex conjugate unit, so that the filter obtains N crosstalk coefficients Wxy of crosstalk inflicted on signal in one polarization-state of said one channel and respectively corresponding to the N optical transmission spans, and N crosstalk coefficients Wyx of crosstalk inflicted on signal in another polarization-state of said one channel and respectively corresponding to the N optical transmission spans; and a summating unit, for summating the N crosstalk coefficients Wxy, and for summating the N crosstalk coefficients Wyx.

Excursus 5: The crosstalk coefficient estimating apparatus according to Excursus 4, wherein the switch controller further controls to input signals of M other channels other than said one channel in the optical fiber transmission system as signals of the another channel into the plurality of input filters on a one-by-one basis, M being a positive integer greater than 1, so that the filter obtains N×M crosstalk coefficients Wxy of crosstalk inflicted on the signal in one polarization-state of said one channel and respectively corresponding to the N optical transmission spans and the M other channels, and N×M crosstalk coefficients Wyx of crosstalk inflicted in another polarization-state signal of said one channel and respectively corresponding to the N optical transmission spans and the M other channels; the summating unit for summating the N×M crosstalk coefficients Wxy, and for summating the N×M number of crosstalk coefficients Wyx.

Excursus 6: The crosstalk coefficient estimating apparatus according to Excursus 1, further comprising: a system parameter inputting unit, for obtaining the system parameters of the optical fiber transmission system; and a filter setting unit, for setting the transmission function of the filter.

Excursus 7: The crosstalk coefficient estimating apparatus according to Excursus 6, wherein the optical fiber transmission system comprises N optical transmission spans, N is a positive integer greater than 1, and the crosstalk coefficient estimating apparatus further comprises an input filter, a switch controller, and a summating unit: the filter setting unit performs N types of settings on the transmission function of the input filter, and the input filter with differently set transmission functions filters signals input thereto, so as to obtain N sets of signals respectively corresponding to the optical transmission spans; the switch controller controls to input the signals of the another channel into the input filter with differently set transmission functions, and controls signal in which polarization-state in the signals obtained by the input filter enters the complex conjugate unit, so that the filter obtains N crosstalk coefficients Wxy of crosstalk inflicted on the signal in one polarization-state of said one channel and respectively corresponding to the N optical transmission spans, and N crosstalk coefficients Wyx of crosstalk inflicted on signal in another polarization-state of said one channel and respectively corresponding to the N optical transmission spans; and the summating unit summates the N crosstalk coefficients Wxy, and summates the N crosstalk coefficients Wyx.

Excursus 8: The crosstalk coefficient estimating apparatus according to Excursus 7, wherein the switch controller further controls to input signals of M other channels other than said one channel in the optical fiber transmission system as signals of the another channel into the input filters on a one-by-one basis, M being a positive integer greater than 1, so that the filter obtains N×M crosstalk coefficients Wxy of crosstalk inflicted on the signal in one polarization-state of said one channel and respectively corresponding to the N optical transmission spans and the M other channels, and N×M crosstalk coefficients Wyx of crosstalk inflicted on signal in another polarization-state of said one channel and respectively corresponding to the N optical transmission spans and the M other channels; and wherein the summating unit summates the N×M crosstalk coefficients Wxy, and summates the N×M crosstalk coefficients Wyx.

Excursus 9: The crosstalk coefficient estimating apparatus according to Excursus 1, further comprising: a second complex conjugate unit, for obtaining a complex conjugate signal for signal in the another polarization-state of the another channel; a second multiplying unit, for multiplying the complex conjugate signal obtained by the second complex conjugate unit with the signal in the one polarization-state of the another channel; and a second filter, for filtering the multiplication result of the second multiplying unit to obtain a crosstalk coefficient, wherein a transmission function of the second filter is set according to system parameters of the optical fiber transmission system.

Excursus 10: A crosstalk coefficient estimating apparatus, for estimating a crosstalk coefficient of crosstalk of one channel of an optical fiber transmission system on another channel thereof, the optical fiber transmission system including N optical transmission spans, wherein N is a positive integer greater than 1, the crosstalk coefficient estimating apparatus comprising: N sets of filter pairs, wherein two filters in each filter pair respectively filter signals of two polarization states of the one channel, to obtain input signals of the set of filter pair with respect to two polarization states of an optical transmission span; N crosstalk coefficient estimating apparatuses according to Excursus 3 or 4, for obtaining N sets of crosstalk coefficients with the signals obtained by the N sets of filter pairs as input signals, wherein each set of crosstalk coefficients includes a crosstalk coefficient of crosstalk of the signal of the one channel on the signal of one of the polarization states of the another channel at the corresponding optical transmission span, and a crosstalk coefficient of crosstalk of the signal of the one channel on the signal of another one of the polarization states of the another channel at the corresponding optical transmission span; and a summating unit, for adding the crosstalk coefficient of crosstalk of the signal of the one channel on the signal of one polarization state of the another channel in the N sets of crosstalk coefficients, and for adding the crosstalk coefficient of crosstalk of the signal of the one channel on the signal of the another polarization state of the another channel in the N sets of crosstalk coefficients.

Excursus 11: A crosstalk coefficient estimating apparatus, for estimating crosstalk coefficients of crosstalk of M channels of an optical fiber transmission system on another channel, the crosstalk coefficient estimating apparatus comprising: M crosstalk coefficient estimating apparatuses according to any one of Excursuses 3 to 5, each crosstalk coefficient estimating apparatus obtaining M sets of crosstalk coefficients in accordance with signals of two polarization states of the M channels, wherein each set of crosstalk coefficients includes a crosstalk coefficient of crosstalk of the signal of one corresponding channel in the M channels on the signal of one polarization state of another channel, and a crosstalk coefficient of crosstalk of the signal of the one corresponding channel in the M channels on the signal of another polarization state of the another channel; and a summating unit, for adding the crosstalk coefficient of crosstalk of the signal of the one channel on the signal of one polarization state of the another channel in the M sets of crosstalk coefficients, and for adding the crosstalk coefficient of crosstalk of the signal of the one channel on the signal of the another polarization state of the another channel in the M sets of crosstalk coefficients.

Excursus 12: A crosstalk coefficient estimating method, for estimating a crosstalk coefficient of crosstalk inflicted by one channel on another channel of an optical fiber transmission system, the crosstalk coefficient estimating method comprising: obtaining a complex conjugate signal for signal in one polarization-state of the one channel; multiplying the complex conjugate signal with signal in another polarization-state of the one channel; and filtering the multiplication result by using a filter to obtain a crosstalk coefficient, wherein a transmission function of the filter is set according to system parameters of the optical fiber transmission system.

Excursus 13: A system cost estimating apparatus, for estimating a system cost of an optical fiber transmission system in accordance with a crosstalk coefficient estimated by the crosstalk coefficient estimating apparatus according to Excursuses 1-11.

Excursus 14: A system cost estimating apparatus, for estimating a system cost of an optical fiber transmission system in accordance with a crosstalk coefficient estimated by the crosstalk coefficient estimating method according to Excursus 12.

In the above descriptions of the specific embodiments of the present invention, features described and/or illustrated with respect to one embodiment can be used in one or more other embodiments in the same or similar manner, be combined with features in other embodiments, or replace features in other embodiments.

As should be emphasized, the term "including/comprising", "include/comprise" as used in this paper indicates the existence of features, essentials, steps or component parts, but does not exclude the existence or addition of one or more other features, essentials, steps or component parts.

In addition, methods according to the present invention are not restricted in being performed according to the temporal sequences described in the Description, as it is also possible to be performed temporally sequentially in other manners, in parallel to one another or independently of one another. Accordingly, sequences for executing the methods as described in the Description are not restrictive of the technical scope of the present invention. Furthermore, the present invention is also not limited in being applied to the polarization multiplexing system.

The invention claimed is:

1. A crosstalk coefficient estimating apparatus, for estimating a crosstalk coefficient of crosstalk inflicted on one channel of an optical fiber transmission system comprising two or more channels, the crosstalk coefficient estimating apparatus comprising:
   a complex conjugate unit to obtain a complex conjugate signal of a signal which is in one polarization-state and is from another channel other than said one channel;
   a multiplying unit to multiply the complex conjugate signal obtained by the complex conjugate unit with a signal which is in another polarization-state and from the another channel; and
   a filter to filter the result of the multiplication to obtain a crosstalk coefficient of crosstalk on a signal which is in one polarization-state and from said one channel,
   wherein a transmission function of the filter is set according to system parameters of the optical fiber transmission system.

2. The crosstalk coefficient estimating apparatus according to claim 1, wherein the system parameters are length L, non-linear coefficient $\gamma$, rate dispersion coefficient $\beta_2$, attenuation coefficient $\alpha$ for the fiber of an optical transmission span of the optical fiber transmission system, and a difference $\Delta w$ between central frequencies of said one channel and the another channel, and wherein the transmission function of the filter is:

$$H(\omega) = -\frac{j8\gamma}{9} \frac{e^{(-\alpha+j\omega\beta_2\Delta\omega)L} - 1}{-\alpha + j\omega\beta_2\Delta\omega}.$$

3. The crosstalk coefficient estimating apparatus according to claim 1, further comprising a switch controller that controls signal in what polarization-state of the another channel should be input to the complex conjugate unit, to obtain crosstalk coefficients of crosstalk inflicted on signals in two polarization-state of said one channel.

4. The crosstalk coefficient estimating apparatus according to claim 1, wherein the optical fiber transmission system comprises N optical transmission spans, where N is a positive integer greater than 1, the crosstalk coefficient estimating apparatus further comprising:
   an input filter unit that comprises N input filters, the N input filters respectively filtering input signals thereof according to different transmission functions, to obtain N sets of signals respectively corresponding to the optical transmission spans;
   a switch controller for controlling to make signals of the another channel inputted into each of the plurality of input filters, and for controlling signal in what polarization-state in the signals obtained by each of the input filters enters the complex conjugate unit, so that the filter obtains N crosstalk coefficients Wxy of crosstalk on signal in one polarization-state of said one channel and respectively corresponding to the N optical transmission spans, and N crosstalk coefficients Wyx of crosstalk on signal in another polarization-state of said one channel and respectively corresponding to the N optical transmission spans; and
   a summating unit to summate the N crosstalk coefficients Wxy, and for summating the N crosstalk coefficients Wyx.

5. The crosstalk coefficient estimating apparatus according to claim 4, wherein the switch controller further controls to make signals of M other channels other than said one channel in the optical fiber transmission system as signals of the another channel inputted into the plurality of input filters on a one-by-one basis, M being a positive integer greater than 1, so that the filter obtains N×M crosstalk coefficients Wxy of crosstalk on signals in one polarization-state of said one channel and respectively corresponding to the N optical transmission spans and the M other channels, and N×M crosstalk coefficients Wyx of crosstalk in another polarization-state signal of said one channel and respectively corresponding to the N optical transmission spans and the M other channels;
   the summating unit to summate the N×M crosstalk coefficients Wxy, and for summating the N×M number of crosstalk coefficients Wyx.

6. The crosstalk coefficient estimating apparatus according to claim 1, further comprising:
   a system parameter inputting unit to obtain the system parameters of the optical fiber transmission system; and
   a filter setting unit to set the transmission function of the filter.

7. The crosstalk coefficient estimating apparatus according to claim 6, wherein the optical fiber transmission system comprises N optical transmission spans, N is a positive integer greater than 1, and the crosstalk coefficient estimating apparatus further comprises an input filter, a switch controller, and a summating unit:

the filter setting unit performs N types of settings on the transmission function of the input filter unit, and the input filter unit with differently set transmission functions can filter signals input thereto, so as to obtain N sets of signals respectively corresponding to the optical transmission spans;

the switch controller controls to make signals of the another channel inputted into the input filter with differently set transmission functions, and controls signal in what polarization-state in the signals obtained by the input filter enters the complex conjugate unit, so that the filter obtains N crosstalk coefficients Wxy of crosstalk on signal in one polarization-state of said one channel and respectively corresponding to the N optical transmission spans, and N crosstalk coefficients Wyx of crosstalk inflicted on signal in another polarization-state of said one channel and respectively corresponding to the N optical transmission spans; and the summating unit summates the N crosstalk coefficients Wxy, and summates the N crosstalk coefficients Wyx.

8. The crosstalk coefficient estimating apparatus according to claim 7, wherein the switch controller further controls to make signals of M other channels other than said one channel in the optical fiber transmission system as signals of the another channel inputted into the input filters on a one-by-one basis, M being a positive integer greater than 1, so that the filter obtains N×M crosstalk coefficients Wxy of crosstalk on signal in one polarization-state of said one channel and respectively corresponding to the N optical transmission spans and the M other channels, and N×M crosstalk coefficients Wyx of crosstalk inflicted on signal in another polarization-state of said one channel and respectively corresponding to the N optical transmission spans and the M other channels; and wherein the summating unit summates the N×M crosstalk coefficients Wxy, and summates the N×M crosstalk coefficients Wyx.

9. The crosstalk coefficient estimating apparatus according to claim 1, further comprising:

a second complex conjugate unit to obtain a complex conjugate signal of a signal in the another polarization-state of the another channel;

a second multiplying unit to multiply the complex conjugate signal obtained by the second complex conjugate unit with signal in the one polarization-state of the another channel; and a second filter to filter the multiplication result of the second multiplying unit to obtain a crosstalk coefficient, wherein a transmission function of the second filter is set according to system parameters of the optical fiber transmission system.

10. A crosstalk coefficient estimating method, for estimating a crosstalk coefficient of crosstalk inflicted by one channel on another channel of an optical fiber transmission system, the crosstalk coefficient estimating method comprising:

obtaining a complex conjugate signal of a signal in one polarization-state of the one channel;

multiplying the complex conjugate signal with a signal in another polarization-state of the one channel; and filtering the result of multiplication by using a filter to obtain a crosstalk coefficient, wherein a transmission function of the filter is set according to system parameters of the optical fiber transmission system.

* * * * *